US010733572B2

(12) United States Patent
Huang et al.

(10) Patent No.: US 10,733,572 B2
(45) Date of Patent: Aug. 4, 2020

(54) DATA PROTECTION USING ALERTS TO DELAY TRANSMISSION

(71) Applicant: Microsoft Technology Licensing, LLC, Redmond, WA (US)

(72) Inventors: Shen Huang, San Jose, CA (US); Yongzheng Zhang, San Jose, CA (US); Chi-Yi Kuan, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/853,658

(22) Filed: Dec. 22, 2017

(65) Prior Publication Data
US 2019/0197479 A1 Jun. 27, 2019

(51) Int. Cl.
| | |
|---|---|
| H04W 4/14 | (2009.01) |
| G06Q 10/10 | (2012.01) |
| H04L 12/58 | (2006.01) |
| H04L 29/06 | (2006.01) |
| G06F 21/55 | (2013.01) |
| G06F 21/62 | (2013.01) |

(52) U.S. Cl.
CPC .......... *G06Q 10/107* (2013.01); *G06F 21/55* (2013.01); *G06F 21/62* (2013.01); *H04L 51/046* (2013.01); *H04L 51/12* (2013.01); *H04L 51/18* (2013.01); *H04L 51/32* (2013.01); *H04L 51/34* (2013.01); *H04L 63/0227* (2013.01); *H04W 4/14* (2013.01)

(58) Field of Classification Search
CPC .............................. G06Q 10/10; G06Q 10/107

USPC ............ 455/466, 412.1, 412.2; 709/206, 207
See application file for complete search history.

(56) References Cited

U.S. PATENT DOCUMENTS

| | | | |
|---|---|---|---|
| 2003/0131060 A1* | 7/2003 | Hartselle | G06Q 10/107 709/206 |
| 2005/0041793 A1* | 2/2005 | Fulton | H04M 3/42263 379/211.01 |
| 2008/0059649 A1* | 3/2008 | Bradley | G06Q 10/109 709/232 |
| 2010/0161673 A1* | 6/2010 | Kandanala | G06Q 10/00 707/802 |
| 2015/0324753 A1* | 11/2015 | Dantuluri | G06Q 10/1095 705/7.19 |
| 2017/0230323 A1* | 8/2017 | Jakobsson | H04L 51/12 |
| 2018/0177136 A1* | 6/2018 | Reimann | G06Q 10/06 |

* cited by examiner

*Primary Examiner* — Jinsong Hu
*Assistant Examiner* — Farideh Madani
(74) *Attorney, Agent, or Firm* — Schwegman Lundberg & Woessner, P.A.

(57) ABSTRACT

Techniques for delaying the transmission of a message to one or more recipients using an alert in order to provide data protection and security with respect to data included in the message are disclosed herein. In some embodiments, a computer-implemented method comprises: receiving a request to transmit a message from a computing device of a user to a recipient, the request comprising content of the message; detecting an issue with the request using at least one classifier to classify the request as having the issue; generating an alert based on the detecting of the issue; and prior to transmitting the message to a destination associated with the recipient, causing the generated alert to be displayed on the computing device of the user, the alert indicating the issue with the message.

18 Claims, 11 Drawing Sheets

DATA PROTECTION USING ALERTS TO DELAY TRANSMISSION

TECHNICAL FIELD

The present application relates generally to data security and verification and, in one specific example, to methods and systems of delaying the transmission of a message to one or more recipients using alerts in order to provide data protection and security with respect to data included in the message.

BACKGROUND

Electronic messaging services and applications (e.g., instant messaging, online chats, text messaging, and e-mail) provide a useful way for users to communicate with one another, enabling users to transmit messages to one another with the simple click of a button or the tap of the screen. Although the speed at which a user can create and send a message using such technologies is appealing to users, these technologies suffer from a lack of an accurate and effective solution for preventing a user from accidentally sending information to a recipient for whom the information was not intended or for whom the information is otherwise inappropriate. This technical problem is particularly relevant to real-time messaging, as users on these platforms often switch between different conversations, contacts and chat groups actively. Because users switch between multiple conversations, there is a risk that they may send messages to the wrong recipient. For example, a user may intend to send a recipe to a friend, but mistakenly sends data for a confidential project plan to the friend.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
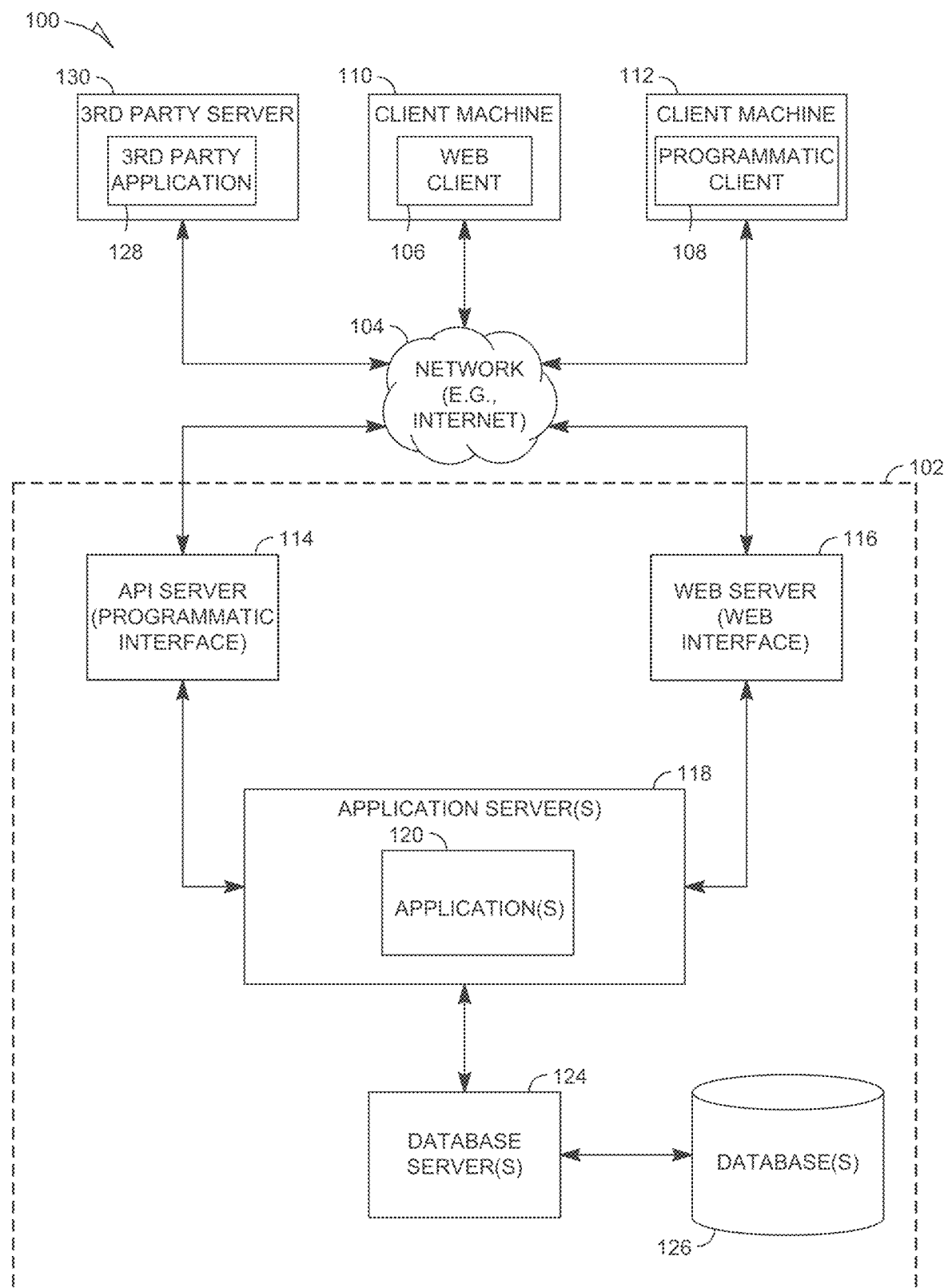
FIG. 1 is a block diagram illustrating a client-server system, in accordance with an example embodiment.

Example methods and systems of delaying the transmission of a message to one or more recipients using alerts in order to provide data protection and security with respect to data included in the message are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to enable a computer system to automatically and intelligently delay the transmission of a message to one or more recipients, using alerts to notify the user who requested that the message be transmitted about one or more issues with the message before proceeding with the transmission of the message to the recipient(s). As a result, the computer system is able to improve data security. Additionally, other technical effects will be apparent from this disclosure as well.

In some example embodiments, the technical solutions disclosed herein leverage both a social network structure and machine learning techniques to optimize the accuracy and effectiveness of the alerts generated in delaying the transmission of messages In some example embodiments, the computer system disclosed herein builds one or more machine-learned models that produce a value representing the likelihood of a to-be-sent message being sensitive, being addressed to an inappropriate recipient, or having some other issue for which the transmission of the message should be delayed. The computer system, using the trained model(s), may assess if a piece of content of a message is appropriate for a target recipient of the message in real-time, and may provide the user who composed the message an alert in real-time before the message is transmitted to a destination associated with the target recipient (e.g., transmitted to an e-mail address of the target recipient, posted on a messaging application on a computing device of the target recipient). As a result, the volume of messages that are sent to the wrong recipient are dramatically reduced, thereby protecting sensitive data.

In some example embodiments, operations are performed by a computer system (or other machine) having a memory and at least one hardware processor, with the operations comprising: receiving a request to transmit a message from a computing device of a user to a recipient, the request comprising content of the message and an identification of the recipient; detecting an issue with the request using at least one classifier to classify the request as having the issue; generating an alert based on the detecting of the issue; and prior to transmitting the message to a destination associated with the recipient, causing the generated alert to be displayed on the computing device of the user, the alert indicating the issue with the message. In some example embodiments, the message comprises an instant message, a chat message, a text message, or an e-mail message.

In some example embodiments, the detecting of the issue comprises accessing profile data of a profile of the recipient stored in a database of a social networking service, and the detecting of the issue is based on the accessed profile data of the profile of the recipient. In some example embodiments, the detecting of the issue comprises accessing profile data of a profile of the user stored in the database of the social networking service, and the detecting of the issue is based on a combination of the accessed profile data of the profile of the recipient and the accessed profile data of the profile of the user. In some example embodiments, the detecting of the issue is based on a combination of the accessed profile data of the profile of the recipient and the content of the message. In some example embodiments, the content of the message comprises text in a body field of the message. In some example embodiments, the content of the message comprises a file that is attached to the message.

In some example embodiments, the generated alert comprises: a prompting of the user to respond to the displayed alert with feedback corresponding to the detected issue, and at least one user interface element configured to enable the user to submit feedback corresponding to the detected issue in response to the displayed alert. In some example embodiments, the operations further comprise: determining that the user has not submitted feedback corresponding to the detected issue within a predetermined time period, and discarding the message without transmitting the message to the destination of the recipient based on the determining that the user has not submitted feedback corresponding to the detected issue within the predetermined time period. In some example embodiments, the operations further comprise: receiving feedback submitted by the user via the at least one user interface element in response to the displayed alert, the feedback comprising a confirmation that the message is to be transmitted to the recipient; and based on the feedback, using the request as training data in performing a machine learning process to train the at least one classifier.

In some example embodiments, the at least one classifier comprises: a first classifier configured to determine whether the content of the message corresponds to a domain or industry to which the recipient corresponds; a second classifier configured to determine whether an organization to which the recipient belongs is a competitor of an organization to which the user belongs; and a third classifier configured to determine whether the recipient works within a specific department to which the content of the message corresponds.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
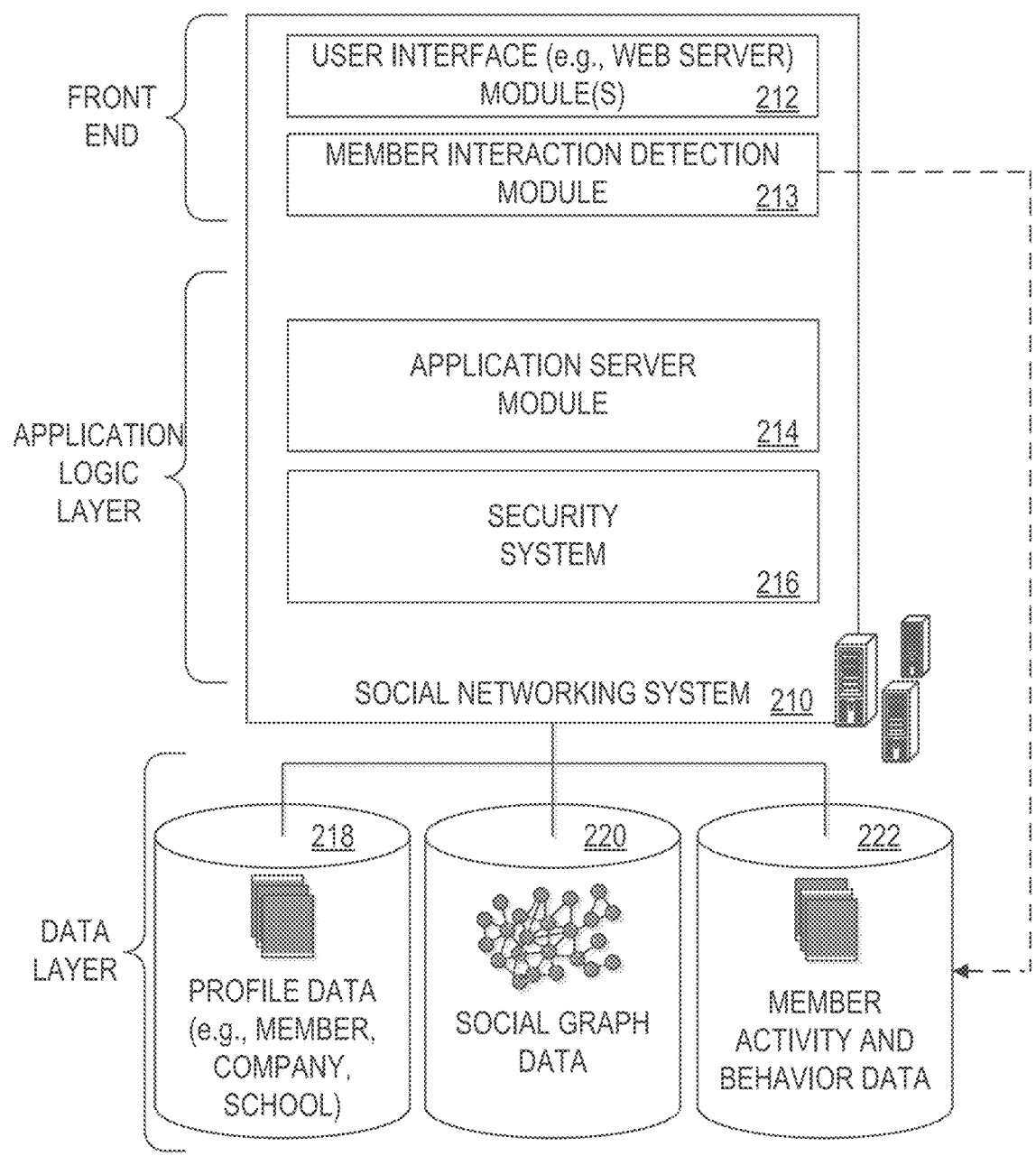
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a security system 216, for use in social networking system 210, consistent with some embodiments of the present disclosure. In some embodiments, the security system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the security system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the security system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
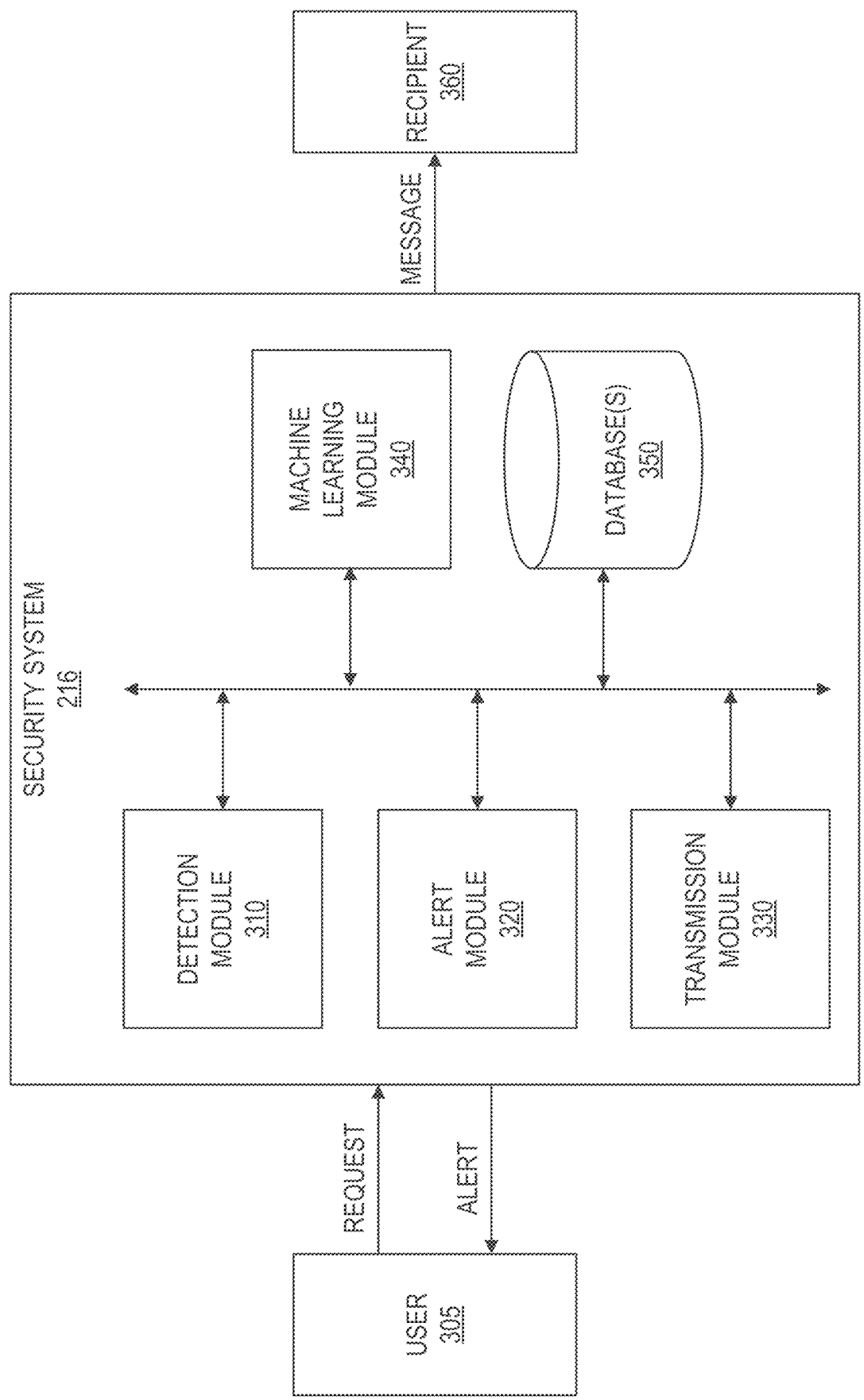
FIG. 3 is a block diagram illustrating components of a security system, in accordance with an example embodiment.

FIG. 3 is a block diagram illustrating components of the security system 216, in accordance with an example embodiment. In some embodiments, the security system 216 comprises any combination of one or more of a detection module 310, an alert module 320, a transmission module 330, a machine learning module 340, and one or more database(s) 350. The modules 310, 320, 330, and 340 and the database(s) 350 can reside on a computer system, or other machine, having a memory and at least one processor (not shown). In some embodiments, the modules 310, 320, 330, and 340 and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the modules 310, 320, 330, and 340, as well as the database(s) 350, are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, and 340 is configured to receive user input. For example, one or more of the modules 310, 320, 330, and 340 can present one or more GUI elements (e.g., drop-down menu, selectable buttons, text field) with which a user can submit input.

In some example embodiments, one or more of the modules 310 and 320 is configured to perform various communication functions to facilitate the functionality described herein, such as by communicating with the social networking system 210 via the network 104 using a wired or wireless connection. Any combination of one or more of the modules 310, 320, 330, and 340 may also provide various web services or functions, such as retrieving information from the third party servers 130 and the social networking system 210. Information retrieved by the any of the modules 310, 320, 330, and 340 may include profile data corresponding to users and members of the social networking service of the social networking system 210.

Additionally, any combination of one or more of the modules 310, 320, 330, and 340 can provide various data functionality, such as exchanging information with database(s) 350 or servers. For example, any of the modules 310, 320, 330, and 340 can access member profiles that include profile data from the database(s) 350, as well as extract attributes and/or characteristics from the profile data of member profiles. Furthermore, the one or more of the modules 310, 320, 330, and 340 can access profile data, social graph data, and member activity and behavior data from database(s) 350, as well as exchange information with third party servers 130, client machines 110, 112, and other sources of information.

In some example embodiments, the detection module 310 is configured to receive, from a computing device of a user 305 (e.g., any of machines 110, 112, and 130 in FIG. 1) a request to transmit a message to one or more recipients 360. In some example embodiments, transmitting a message to a recipient 360 comprises transmitting the message to a destination associated with the recipient 360, such as to an e-mail account of the recipient or to a mobile application on a mobile device of the recipient 360, depending on the type and the context of the message that the user 305 is requesting to be transmitted. Examples of types and contexts of messages are within the scope of the present disclosure include, but are not limited to, an instant message in the context of an instant messaging application, a chat message in the context of an online chat application, a text message in the context of a texting application, and an e-mail message in the context of an e-mail application. It is contemplated that other types and contexts of messages are within the scope of the present disclosure.

In some example embodiments, the request comprises content of the message. The content may comprise any content that is input by the user 305 in composing the message. In some example embodiments, the content of the message comprises any combination of one or more of text in a body field of the message, text in a subject field of the message, and a file that is attached to the message (e.g., a file containing text, a video file, an audio file, a multimedia file). It is contemplated that other types of content are also within the scope of the present disclosure.

In some example embodiments, the request comprises an identification of the recipient(s) 360. The identification of the recipient(s) 360 may have a combination of one or more of the following characteristics: be visible on the computing device of the user 305 at the time the user 305 submits the request for its transmission, be entered by the user 305 as part of the request for the transmission of the message (e.g., an e-mail address entered into a target recipient field by the user), be invisible on the computing device of the user 305 at the time the user 305 submits the request for its transmission, and be automatically included as part of the request by an application on the computing device of the user 305 in embodiments where multiple messages are being sent back-and-forth between the user 305 and the recipient(s) 360 during the same conversation or session and where the user 305 does not need to explicitly enter the recipient(s) 360 each time the user 305 composes and requests transmission of a message (e.g., during a text message conversation or an online chat session).

In some example embodiments, the detection module 310 is configured to detect an issue (e.g., a problem) with the request using at least one classifier to classify the request as having the issue. The detection module 310 may leverage profile data of the recipient 360 and/or profile data of the user 305 for use in determining whether an issue exists with transmitting the message to the recipient 360. The profile data may be stored in a database of an online service as part of a profile corresponding to the recipient 360 or the user 305. In some example embodiments, the detection module 310 is configured to access profile data of a profile of the recipient 360 and/or to access profile data of a profile of the user 305 stored in a database of a social networking service, such as the social networking system 210 in FIG. 2. The profile data may comprise any of the profile data stored in the database 218 in FIG. 2. In some example embodiments, the detection module 310 is configured to classify the request based on any combination of one or more of profile data of the recipient 360, profile data of the user 305, and the content of the message. The detection module 310 may parse the content of the message, and analyse the content along with the profile data, or other aspects, of the recipient 360 to classify the message as appropriate or inappropriate for the recipient 360. The detection module 310 may detect certain keywords or combinations of keywords in the content that correspond to a particular topic that is inappropriate for a particular recipient 360 or for a particular type of recipient 360.

The profile data is a useful signal in determining how appropriate the message is for the recipient 360, as the profile data indicates whether the recipient 360 and the user 305 belong to the same company, whether the recipient 360 and the user 305 belong to adversarial companies (e.g., competitors), whether the recipient 360 and the user 305 belong to the same department within the same company, whether the recipient 360 and the user 305 have the same or similar educational background, whether the recipient 360 and the user 305 work in the same or similar domain or industry, and whether the recipient 360 and the user 305 have the same or similar interests, as well as other useful insights.

In some example embodiments, the detection module 310 is configured to generate a value representing or corresponding to a level of confidence in the appropriateness of the message for the recipient or conversely a level of confidence in the inappropriateness of the message for the recipient, and then compare the generated value to a threshold value to determine how to classify the request as either having an issue that warrants an alert or as not having such an issue. For example, the detection module 310 may generate a value indicating a 92% level of confidence that the message of the request is inappropriate for the recipient 360, and compare the 92% value against a 50% threshold, above which the detection module 310 delays transmission of the message to the recipient so that an alert can be generated and displayed to the user 305 before the message is transmitted to the recipient 360. It is contemplated that other configurations of generated values and threshold values are also within the scope of the present disclosure.

In some example embodiments, the alert module 320 is configured to generate an alert based on the detection of an issue by the detection module 310, and to, prior to any transmission of the message to the recipient 360 (e.g., to a destination associated with the recipient 360), cause the generated alert to be displayed on the computing device of the user 305. In some example embodiments, the alert comprises an indication of the issue with the message, such as an identification of the recipient and/or the content that has been detected by the detection model 310 as an issue. In some example embodiments, the generated alert comprises a prompting of the user 305 to respond to the displayed alert with feedback corresponding to the detected issue, and at least one user interface element configured to enable the user 305 to submit feedback corresponding to the detected issue in response to the displayed alert.

Figure 4A:
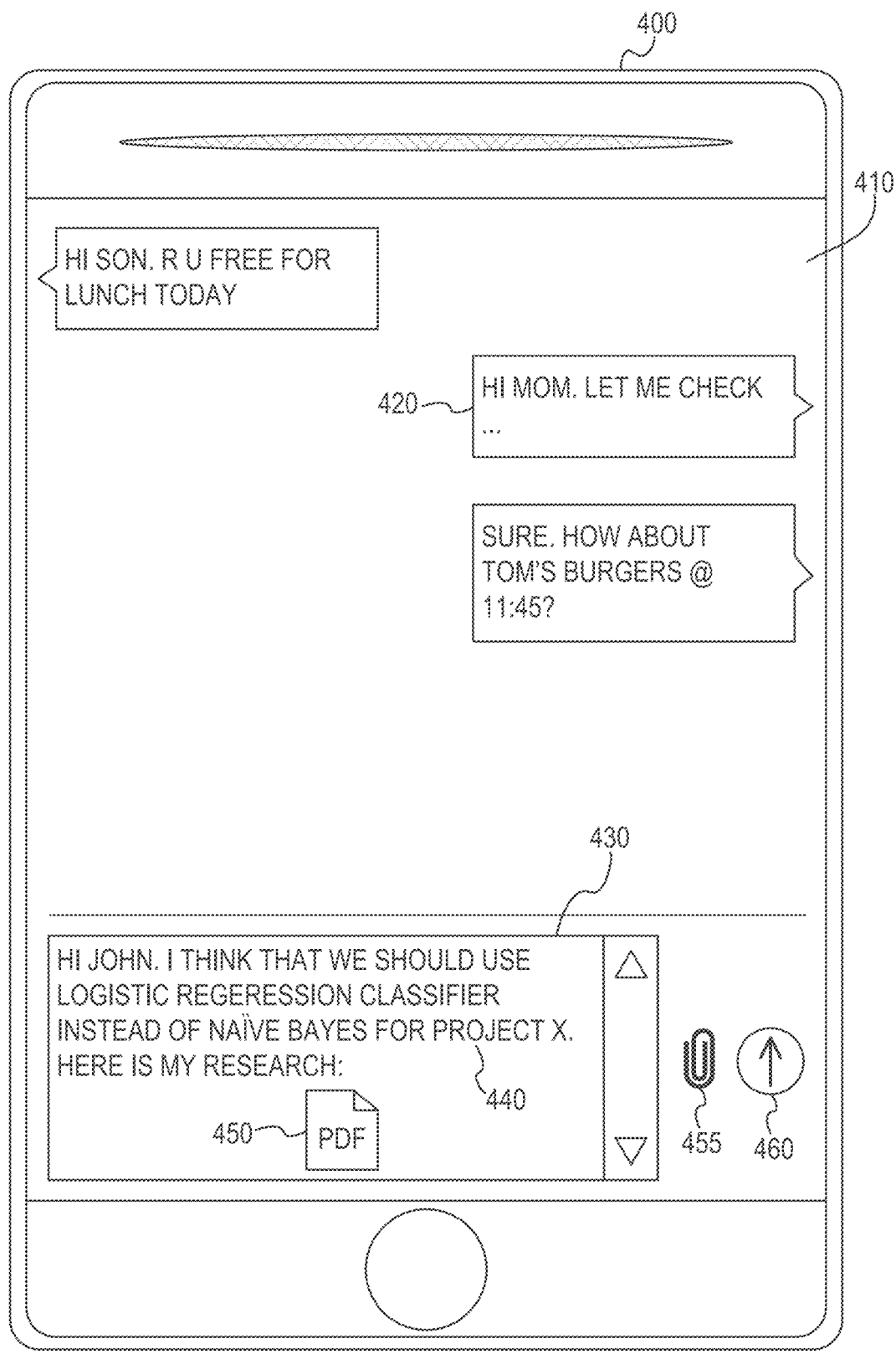
FIGS. 4A-4B illustrate a security system delaying the transmission of a chat message or text message in the context of a messaging application on a mobile device, in accordance with an example embodiment.
Figure 4B:
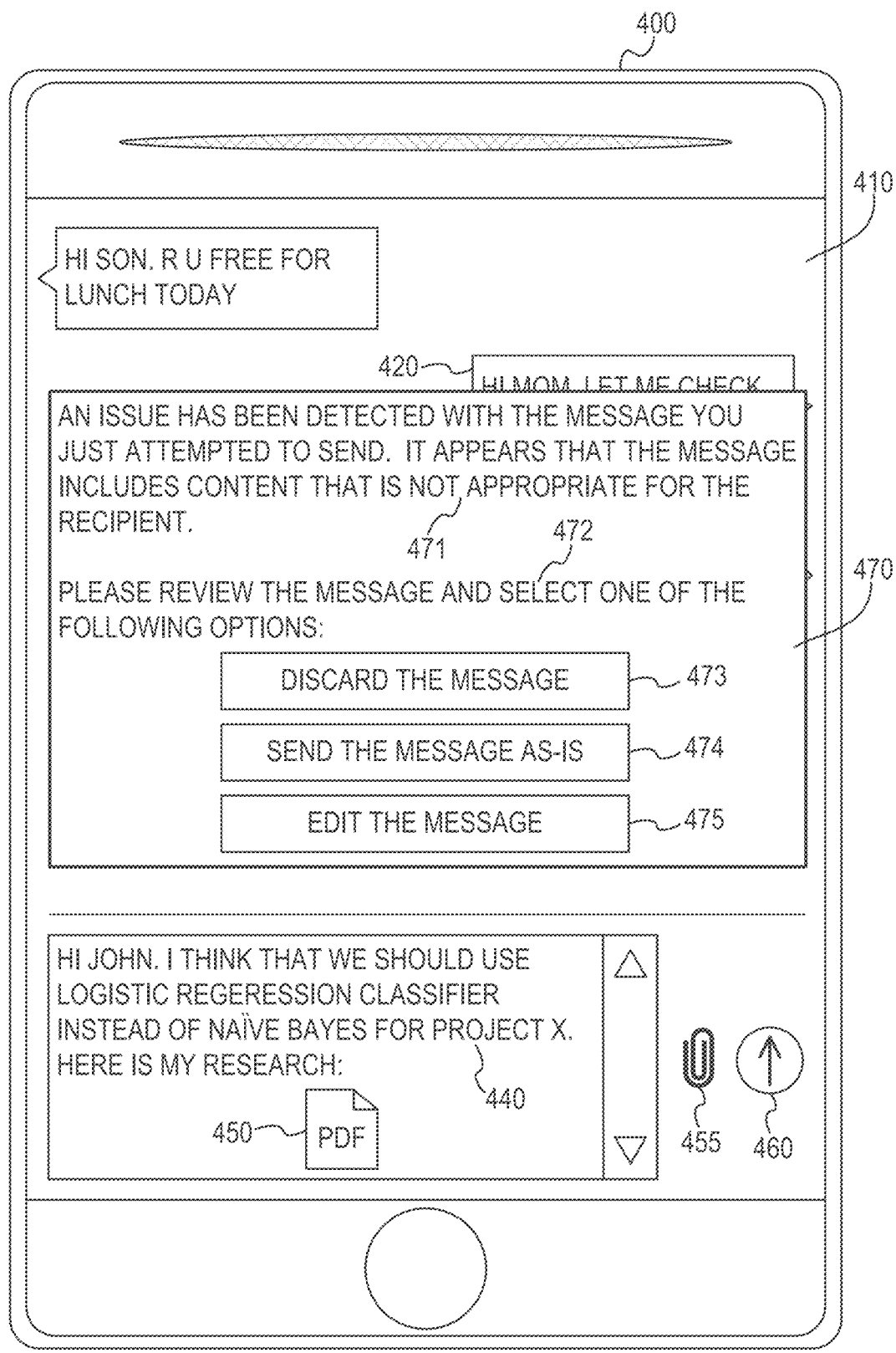

FIGS. 4A-4B illustrate a security system delaying the transmission of a chat message or text message in the context of a messaging application on a mobile device 400, in accordance with an example embodiment. In FIG. 4A, the mobile device 400 comprises a graphical user interface (GUI) 410 in which the messaging application and its functionality are presented to the user 305. As part of the functionality of the messaging application, messages 420 that have been submitted by the user 305 and the recipient 360 are displayed in the GUI 410. The user 305 may enter content of the message via a user interface element 430, such as a text box or field. The content may include text 440 entered by the user 305 or a file 450 attached to the message by the user 305. The user 305 may attach the file 450 to the message using a selectable user interface element 455 configured to enable the user 305 to select a file for attachment to the message. When the user 305 is ready to send the message, the user 305 selects a selectable user interface element 460 configured to transmit a request to the security system 216 via a network. The request comprises a request to transmit the message to the recipient and includes the content submitted by the user 305.

In FIG. 4B, in response to detecting an issue with the request submitted by the user 305, the security system 216 generates an alert and causes the generated alert to be displayed within the GUI 410 of the mobile device 400. In some example embodiments, the generated alert is displayed as a pop-up window 470 that overlays a significant portion of any content that was previously being displayed within the GUI 410, such as the active conversation being managed by the messaging application. In some example embodiments, the alert comprises an indication 471 of the issue detected by the security system 216.

In some example embodiments, the alert also comprises a prompting 472 of the user 305 to respond to the displayed alert with feedback corresponding to the detected issue, and at least one user interface element configured to enable the user 305 to submit feedback corresponding to the detected issue in response to the displayed alert. In FIG. 4B, three selectable user interface elements 473, 474, and 475 are included as part of the alert displayed within the GUI 410. The selectable user interface element 473 is configured to, upon its selection, trigger a transmission of an indication or instruction to the data security system 216 to discard the message without transmitting the message to the recipient 360, and would be selected by the user 305 in situations where the user 305 has reviewed the alert and decided to cancel the transmission of the message to the recipient 360. The selectable user interface element 474 is configured to, upon its selection, trigger a transmission of an indication or instruction to the data security system 216 to transmit the message as it was originally submitted by the user 305 as part of the request, and would be selected by the user 305 in situations where the user 305 has reviewed the alert and decided that the alert is a false alarm because the message is appropriate for the recipient 360. The selectable user interface element 475 is configured to, upon its selection, cause the generated alert to be removed from the GUI 410 (e.g., removing pop-up window 470), bringing the user 305 back to the message-composing stage of FIG. 4A, where the user 305 could then edit the message to make it more appropriate, such as by deleting or otherwise changing the recipient 360 and/or deleting or otherwise changing the content of the message, and would be selected by the user 305 in situations where the user 305 has reviewed the alert and decided to make one or more corrections to the message so that the user 305 can once again attempt to send the message, this time with content having been removed from the original message or a recipient being removed from the original message.

Figure 5A:
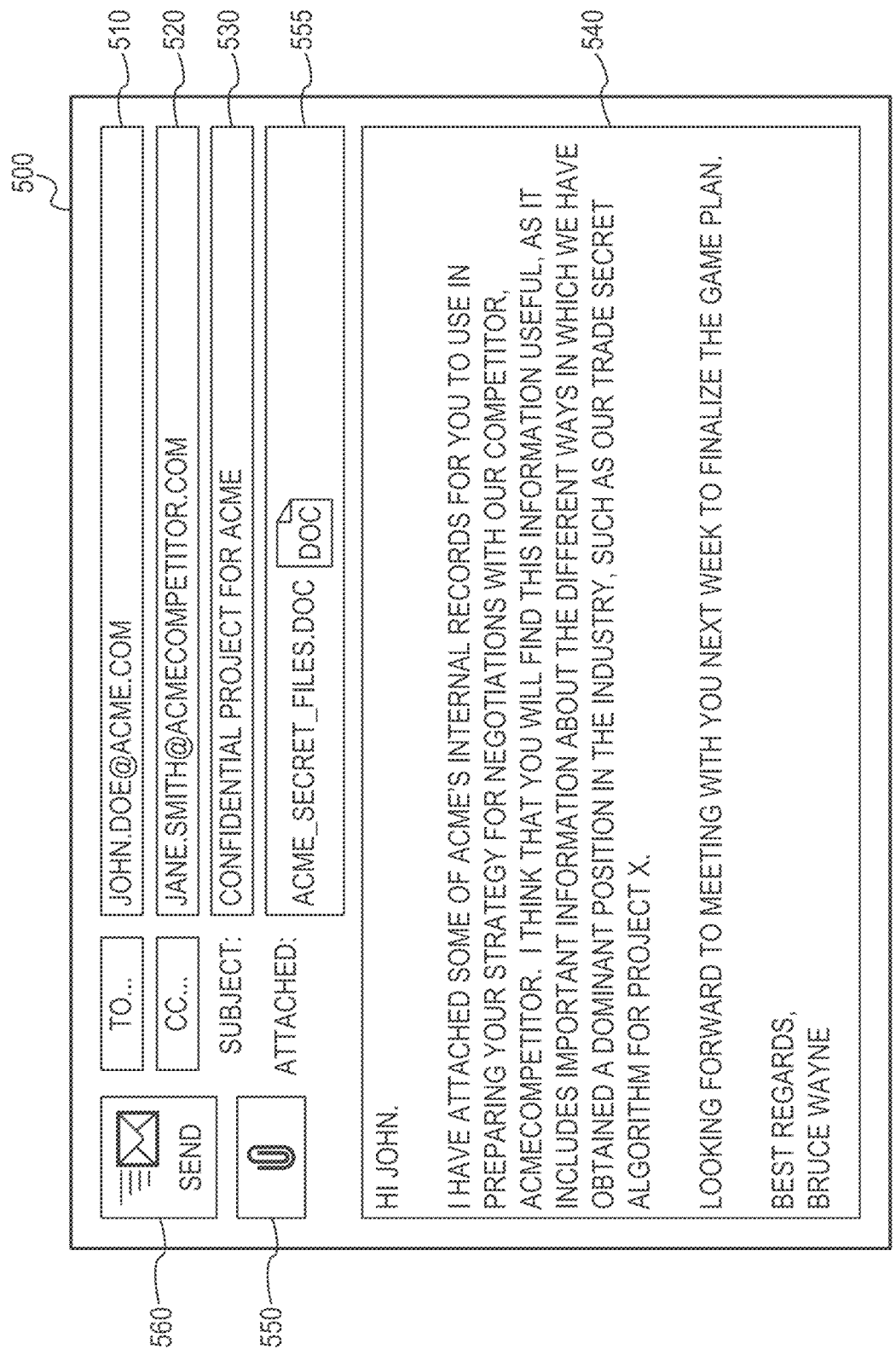
FIGS. 5A-5B illustrate a security system delaying the transmission of an e-mail message in the context of a window for composing an e-mail within an e-mail application, in accordance with an example embodiment.
Figure 5B:
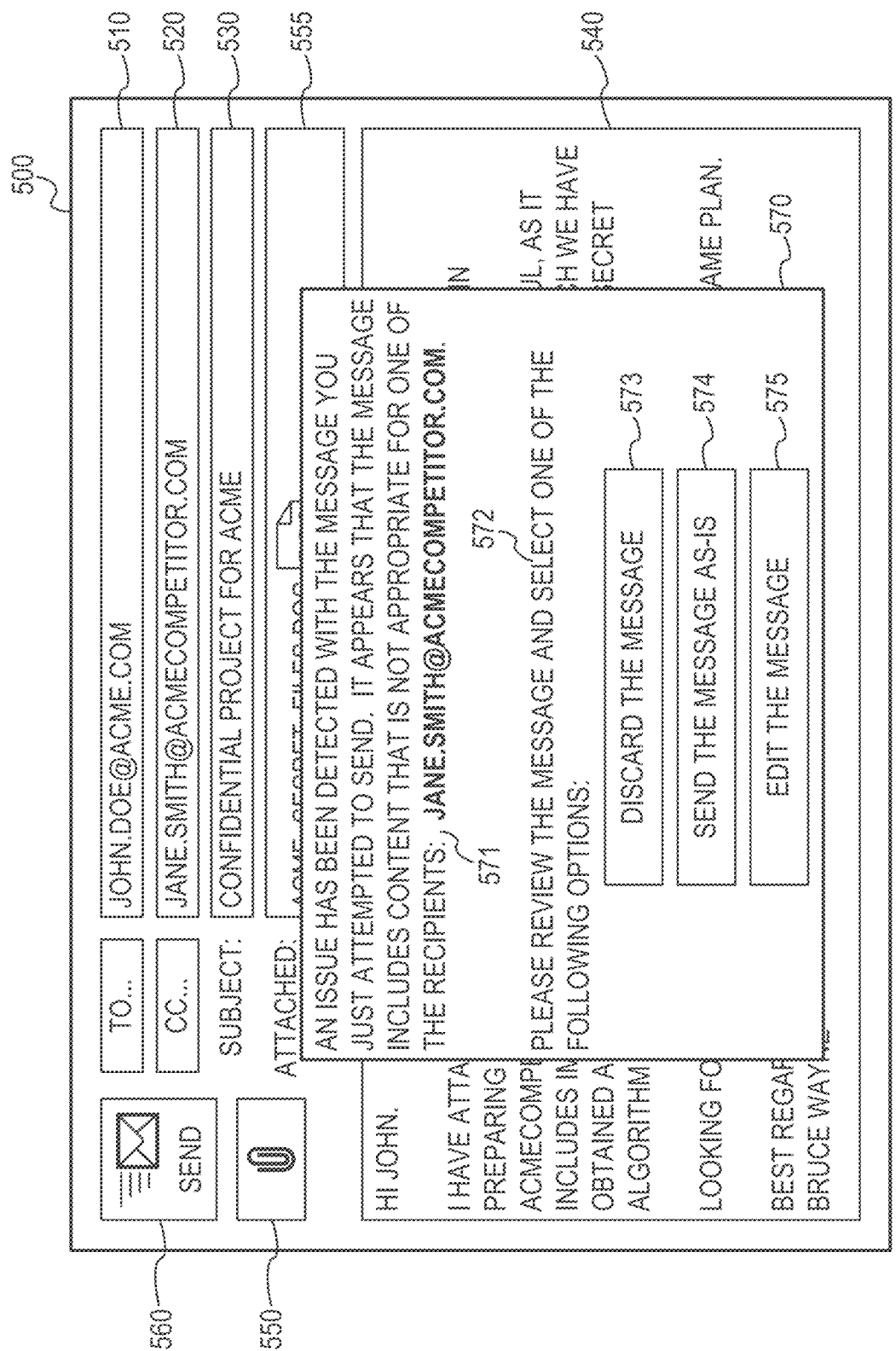

FIGS. 5A-5B illustrate a security system delaying the transmission of an e-mail message in the context of a window 500 for composing an e-mail within an e-mail application, in accordance with an example embodiment In FIG. 5A, the window comprises a GUI in which the e-mail application and its functionality are presented to the user 305. As part of the functionality of the e-mail application, the user 305 may enter content of a message via one or more user interface elements. For example, the user 305 may enter one or more would-be main recipients of the message in a "TO" field 510, one or more would-be copied recipients of the message in a "CC" field 520, a subject of the message in a "SUBJECT" field 530, and the main body text of the message in a body field 540. The user may also select a selectable user interface element 550 to attach a file 555 to the message. When the user 305 is ready to send the message, the user 305 selects a selectable user interface element 560 configured to transmit a request to the security system 216 via a network. The request comprises a request to transmit the message to the recipient and includes the content submitted by the user 305.

In FIG. 5B, in response to detecting an issue with the request submitted by the user 305, the security system 216 generates an alert and causes the generated alert to be displayed within the window 500. In some example embodiments, the generated alert is displayed as a pop-up window 570 that overlays a significant portion of any content that was previously being displayed within the window 500, such as the content of the message. In some example embodiments, the alert comprises an indication 571 of the issue detected by the security system 216. For example, the indication 571 may identify or indicate content of the message that is not appropriate for a particular recipient 360 of the message or a particular recipient 360 of the message for which the content of the message is not appropriate (e.g., "JANE.SMITH@ACMECOMPETITOR.COM" in FIG. 5B).

In some example embodiments, the alert also comprises a prompting 572 of the user 305 to respond to the displayed alert with feedback corresponding to the detected issue, and at least one user interface element configured to enable the user 305 to submit feedback corresponding to the detected issue in response to the displayed alert In FIG. 5B, three selectable user interface elements 573, 574, and 575 are included as part of the alert displayed within the window 500. The selectable user interface element 573 is configured to, upon its selection, trigger a transmission of an indication or instruction to the data security system 216 to discard the message without transmitting the message to the recipient 360, and would be selected by the user 305 in situations where the user 305 has reviewed the alert and decided to cancel the transmission of the message to the recipient 360. The selectable user interface element 574 is configured to, upon its selection, trigger a transmission of an indication or instruction to the data security system 216 to transmit the message as it was originally submitted by the user 305 as part of the request, and would be selected by the user 305 in situations where the user 305 has reviewed the alert and decided that the alert is a false alarm because the message is appropriate for the recipient 360. The selectable user interface element 575 is configured to, upon its selection, remove the generated alert, bringing the user 305 back to the message-composing stage of FIG. 5A, where the user 305 could then edit the message to make it more appropriate, such as by deleting or otherwise changing the recipient 360 and/or deleting or otherwise changing the content of the message, and would be selected by the user 305 in situations where the user 305 has reviewed the alert and decided to make one or more corrections to the message so that the user 305 can once again attempt to send the message, this time with content having been removed from the original message or a recipient being removed from the original message.

In some example embodiments, the transmission module 330 is configured to transmit the message of the request of the user 305 in response to, or otherwise based on, the user 305 submitting feedback that indicates that the message is to be transmitted (e.g., by selecting selectable user interface element 574), and the transmission module 330 is configured to discard the message of the request of the user 305 in response to, or otherwise based on, the user 305 submitting feedback that indicates that the message is to be discarded (e.g., by selecting selectable user interface element 573).

In some example embodiments, the alert module 320 determines whether or not the user has submitted feedback corresponding to the detected issue within a predetermined amount of time, for example, whether the user 305 has submitted feedback within 10 minutes of the generated alert being displayed to the user 305. In some example embodiments, in response to, or otherwise based on, a determination that the user has not submitted feedback corresponding to the detected issue within a predetermined time period, the transmission module 330 is configured to discard the message without transmitting the message to the recipient.

In some example embodiments, the alert module 320 is configured to receive feedback submitted by the user via a user interface element in response to the displayed alert, and based on a determination that the feedback comprises a confirmation that the message is to be transmitted to the recipient, the machine learning module 340 is configured to use the request as training data in performing a machine learning process to train the classifier(s) used by the detection module 310.

Figure 6:
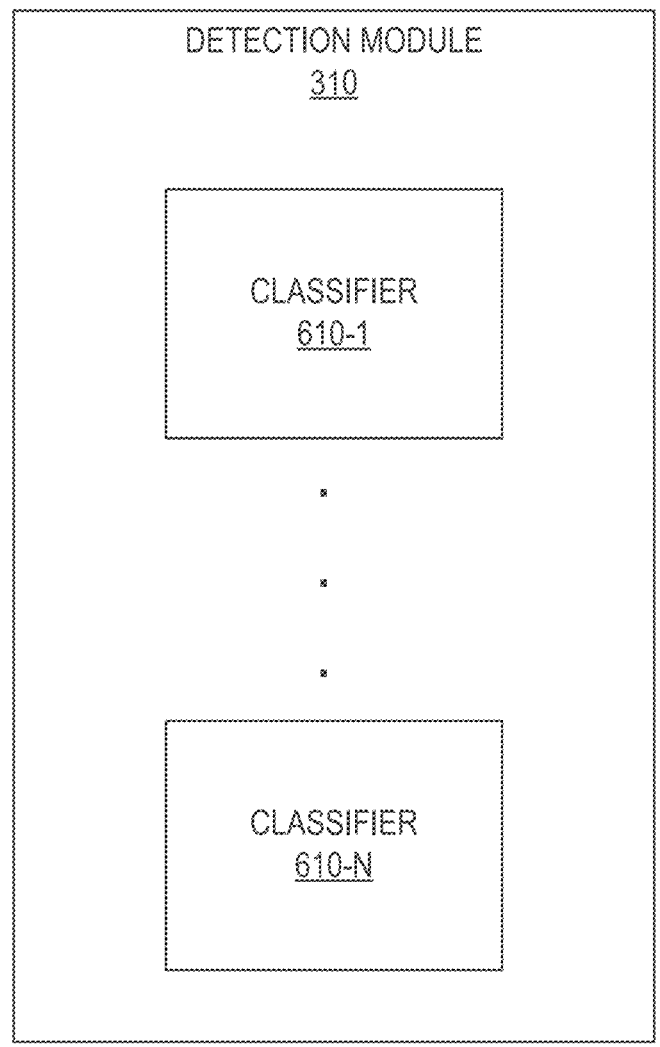
FIG. 6 is a block diagram illustrating components of a detection module, in accordance with an example embodiment.

FIG. 6 is a block diagram illustrating components of a detection module 310, in accordance with an example embodiment. In some example embodiments, the detection module 310 uses multiple classifiers 610 (e.g., CLASSIFIER 610-1, ..., CLASSIFIER 610-N) to handle different scenarios in classifying the request or the message of the request. For example, in some example embodiments, the detection module 310 uses three classifiers: a first classifier (e.g., a domain/industry classifier), a second classifier (e.g., a competitor classifier), and a third classifier (e.g., an organization classifier).

In some example embodiments, the first classifier (e.g., a domain/industry classifier) is configured to determine whether the content of the message corresponds to a domain or industry to which the recipient corresponds. For example, if the user 305 accidentally includes work information for his engineering job in his message to his friend, and it is determined by the detection module 310 that the friend does not have any background or interest in engineering at all based on profile data of the friend, then the first classifier may determine that there is a high probability or likelihood that the message is not appropriate for the friend.

In some example embodiments, the second classifier (e.g., a competitor classifier) is configured to determine whether an organization to which the recipient belongs is a competitor of an organization to which the user belongs. For example, if the user 305 accidentally includes an employee of a competitor in his message to a colleague, and it is determined by the detection module 310 that the employee of the competitor is an employee of the competitor based on the profile data of the employee of the competitor, then the second classifier may determine that there is a high probability or likelihood that the message is not appropriate for the friend.

In some example embodiments, the third classifier (e.g., an organization classifier) is configured to determine whether the recipient works within a specific department to which the content of the message corresponds. For example, if the user 305 works in the human resources department of a company and accidentally includes payroll information in his message another employee of the company that does not work in the human resources department, and it is determined by the detection module 310 that the other employee is not in the human resources department based on profile data of the other employee, then the third classifier may determine that there is a high probability or likelihood that the message is not appropriate for the other employee, thereby preventing the leaking of confidential information among different departments of the same company.

It is contemplated that other configurations of the detection module 310 and other configurations of multiple classifiers 610 are within the scope of the present disclosure In some example embodiments, one classifier is used as a consolidation of the above-described multiple classifiers 610 to enable context-aware assessment on messages to be sent.

The machine learning module 340 may be used by the security system 216 to build one or more robust classification models designed to detect inappropriate and unauthorized content in messaging. In some example embodiments, the machine learning module 340 collects labelled data for use as training data in training the different models 610, then performs a feature engineering process in which raw data is transformed into data that can be processed as training data by the machine learning module 340. In some example embodiments, for the first classifier (e.g., the domain/industry classifier), the machine learning module 340 mainly uses the content of the messages and the industry of the recipients. In some example embodiments, for the second classifier (e.g., the competitor classifier), the machine learning module 340 mainly uses the industries, locations, and employees of companies. In some example embodiments, for the third classifier (e.g., the organization classifier), the machine learning module 340 mainly uses the employees' companies and titles.

In some example embodiments, the machine learning module 340 experiments with different classifiers, such as support vector machine (SVM), Naive Bayes, and Random Forest. Then the classifier with the best performance on both accuracy and speed is selected for real-time assessment. The machine learning module 340 may then perform cross validation to estimate performance of accuracy of the different models. Once a model is determined by the machine learning module 340 to have achieved a targeted goal, it is deployed online on the security system 216. When the models detect any potential issues of a message (e.g., domain/industry, competitor, or organization), the security system 216 alerts the user, as previously discussed. In certain cases, the security system 216 may issue a false alarm. Therefore, the security system 216 provides a mechanism for the users to submit feedback, which the machine learning module 340 uses as training data to further improve classification models. The machine learning module 340 may begin with an initial model based on heuristics and a dictionary (e.g., a blacklist and/or whitelist), and then train the initial model using the training data. The machine learning module 340 may parse the content of messages into segments for use as the training data.

Figure 7:
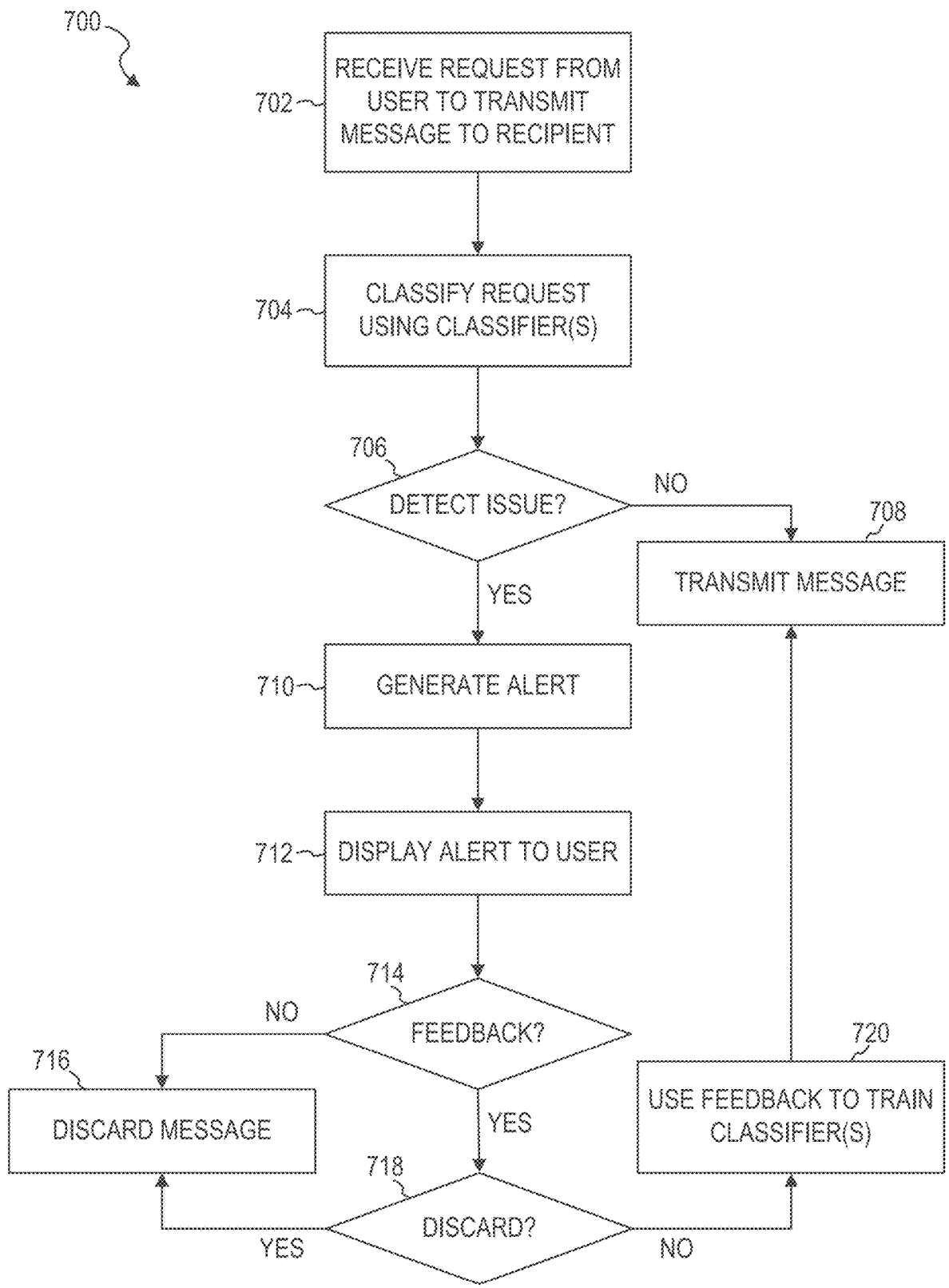
FIG. 7 is a flowchart illustrating a method of data protection, in accordance with an example embodiment.

FIG. 7 is a flowchart illustrating a method 700 of data protection, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the security system 216 of FIGS. 2-3, or any combination of one or more of its modules, as described above.

At operation 710, the security system 216 receives a request to transmit a message from a computing device of a user 305 to a recipient 360, with the request comprising content of the message. In some example embodiments, the message comprises an instant message, a chat message, a text message, or an e-mail message. In some example embodiments, the content of the message comprises text in a body field of the message and/or a file that is attached to the message. In some example embodiments, the request comprises also comprises an identification of the recipient (e.g., an e-mail address, a handle or username).

At operation 720, the security system 216 delays the transmission of the message to the recipient 360, and instead uses one or more classifiers to classify the request as either having an issue or not having an issue. In some example embodiments, the one or more classifiers comprise any combination of one or more of a first classifier configured to determine whether the content of the message corresponds to a domain or industry to which the recipient 360 corresponds, a second classifier configured to determine whether an organization to which the recipient 360 belongs is a competitor of an organization to which the user 305 belongs, and a third classifier configured to determine whether the recipient 360 works within a specific department to which the content of the message corresponds.

In some example embodiments, the security system 216 accesses profile data of a profile of the recipient 360 stored in a database of a social networking service, and then classifies the request based on the accessed profile data of the profile of the recipient 360. In some example embodiments, the security system 216 accesses profile data of a profile of the user 305 stored in the database of the social networking service, and classifies the request based on a combination of the accessed profile data of the profile of the recipient 360 and the accessed profile data of the profile of the user 305. In some example embodiments, the security system 216 classifies the request based on a combination of the accessed profile data of the profile of the recipient 360 and the content of the message.

At operation 730, the security system 216 determines whether or not an issue has been detected based on the classifying of the request performed at operation 720. If, at operation 730, the security system 216 determines that an issue has not been detected, then the method 700 proceeds to operation 708, where the security system 216 transmits the message to the recipient 360. If, at operation 730, the security system 216 determines that an issue has been detected, then the method 700 proceeds to operation 710, where the security system 216 generates an alert based on the detection of the issue.

At operation 712, the security system 216, while still delaying the transmission of the message to the recipient 360, causes the generated alert to be displayed on the computing device of the user 305. In some example embodiments, the alert comprises an indication of the issue with the message. In some example embodiments, the alert comprises a prompting of the user 305 to respond to the displayed alert with feedback corresponding to the detected issue, and at least one user interface element configured to enable the user 305 to submit feedback corresponding to the detected issue in response to the displayed alert.

At operation 714, the security system 216 determines whether or not the user 305 has submitted feedback corresponding to the detected issue within a predetermined period of time. If, at operation 714, the security system 216 determines that the user has not submitted feedback corresponding to the detected issue within the predetermined period of time, then the method 700 proceeds to operation 716, where the security system 216 discards the message without transmitting the message to the recipient 360. If, at operation 714, the security system 216 determines that the user has submitted feedback corresponding to the detected issue within the predetermined period of time, then the method proceeds to operation 718, where the security system 216 determines whether the feedback comprises an instruction to discard the message or an instruction to transmit the message.

If, at operation 718, the security system 216 determines that the feedback comprises an instruction to discard the message, then the method 700 proceeds to operation 716, where the security system 216 discards the message without transmitting the message to the recipient 360. If, at operation 718, the security system 216 determines that the feedback comprises an instruction to transmit the message, then the security system 216 stores a record of the request, data associated with the request (e.g., the accessed profile data, and the feedback corresponding to the request for use as training data in performing a machine learning process to train the classifier(s) 610, and transmits the message at operation 708. The security system 216 then uses this training data, along with other training data, to train the classifier(s) 610.

It is contemplated that any of the other features described within the present disclosure can be incorporated into the method 700.

Example Mobile Device

Figure 8:
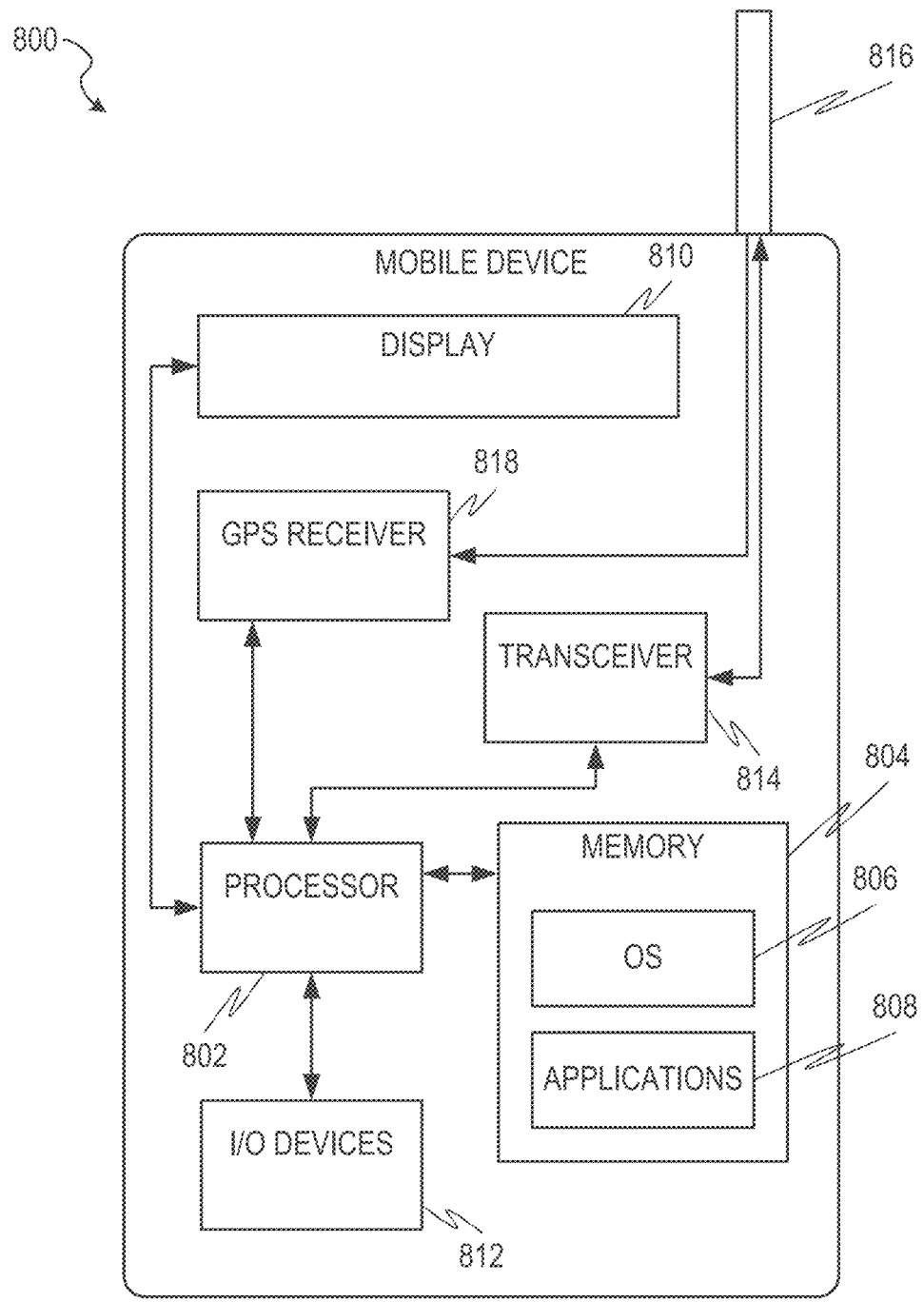
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product. e.g., a computer program tangibly embodied in an information carrier; e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
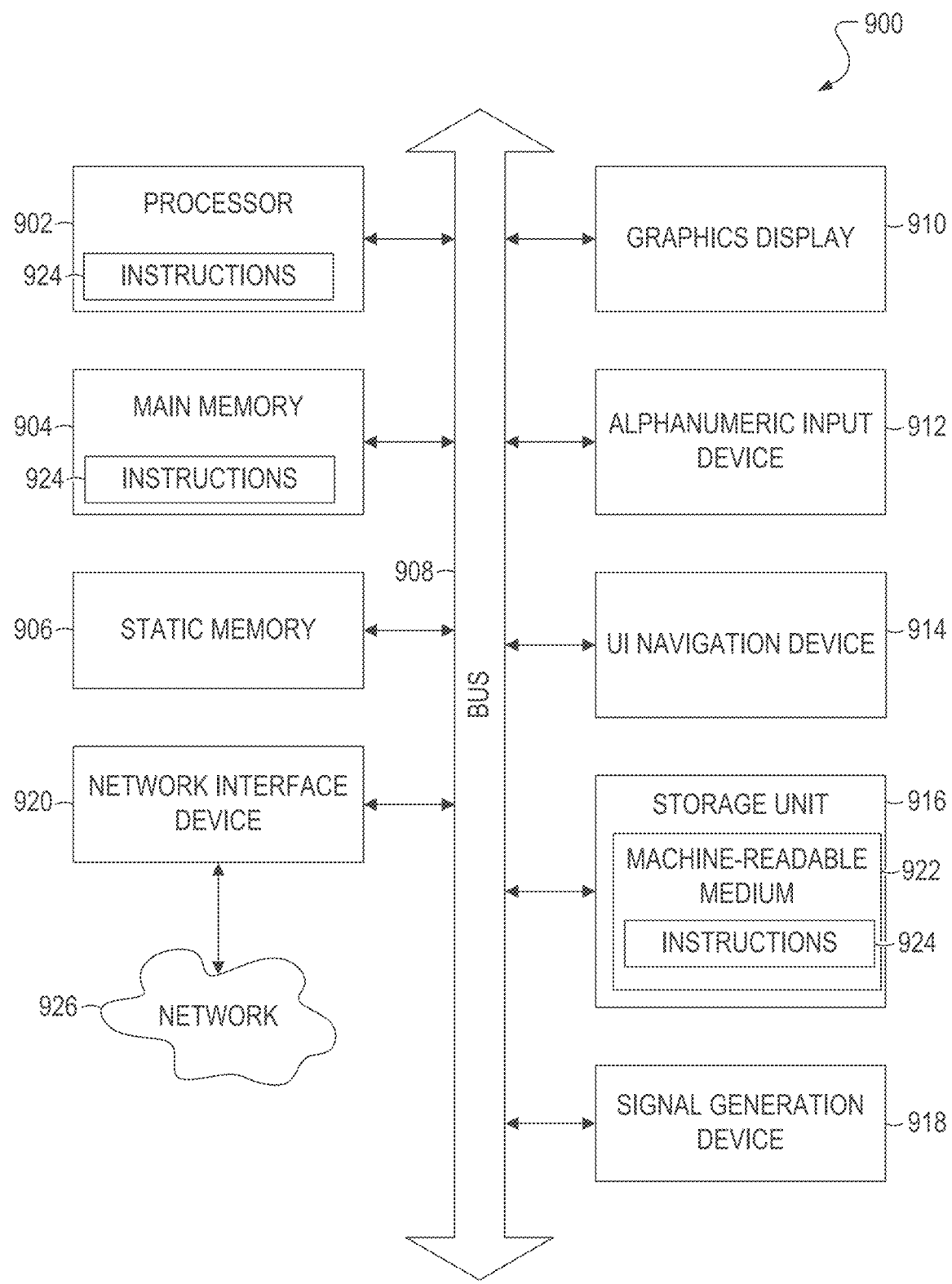
FIG. 9 is a block diagram of an example computer system on which methodologies described herein may be executed, in accordance with an example embodiment.

FIG. 9 is a block diagram of an example computer system 900 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a graphics display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a storage unit 916, a signal generation device 918 (e.g., a speaker) and a network interface device 920.

Machine-Readable Medium

The storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions (e.g., instructions 924) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving, by a computer system having a memory and at least one processor, a request to transmit a message from a computing device of a user via a network to a recipient, the request comprising content of the message;
   detecting, by the computer system, an issue with the request using at least one classifier to classify the request as having the issue, the detecting of the issue comprising accessing profile data of a profile of the recipient stored in a database of a social networking service, and the detecting of the issue is based on a determination that the message is inappropriate for the recipient based on a combination of the accessed profile data of the profile of the recipient and the content of the message, the profile data of the profile of the recipient on which the detecting of the issue is based comprising at least one of a company to which the recipient belongs, a department within the company to which the recipient belongs, educational background information of the recipient, and a work industry of the recipient;
   generating, by the computer system, an alert based on the detecting of the issue; and
   prior to transmitting the message to a destination associated with the recipient via the network, causing, by the computer system, the generated alert to be displayed on the computing device of the user, the alert indicating the issue with the message.

2. The computer-implemented method of claim 1, wherein the detecting of the issue comprises accessing profile data of a profile of the user stored in the database of the social networking service, and the detecting of the issue is based on a combination of the accessed profile data of the profile of the recipient and the accessed profile data of the profile of the user.

3. The computer-implemented method of claim 1, wherein the content of the message comprises text in a body field of the message.

4. The computer-implemented method of claim 1, wherein the content of the message comprises a file that is attached to the message.

5. The computer-implemented method of claim 1, wherein the generated alert comprises:
   a prompting of the user to respond to the displayed alert with feedback corresponding to the detected issue; and
   at least one user interface element configured to enable the user to submit feedback corresponding to the detected issue in response to the displayed alert.

6. The computer-implemented method of claim 5, further comprising:
   determining that the user has not submitted feedback corresponding to the detected issue within a predetermined time period; and
   discarding the message without transmitting the message to the destination of the recipient based on the determining that the user has not submitted feedback corresponding to the detected issue within the predetermined time period.

7. The computer-implemented method of claim 5, further comprising:
   receiving feedback submitted by the user via the at least one user interface element in response to the displayed alert, the feedback comprising a confirmation that the message is to be transmitted to the recipient; and
   based on the feedback, using the request as training data in performing a machine learning process to train the at least one classifier.

8. The computer-implemented method of claim 1, wherein the at least one classifier comprises:
   a first classifier configured to determine whether the content of the message corresponds to a domain or industry to which the recipient corresponds;
   a second classifier configured to determine whether an organization to which the recipient belongs is a competitor of an organization to which the user belongs; and
   a third classifier configured to determine whether the recipient works within a specific department to which the content of the message corresponds.

9. The computer-implemented method of claim 1, wherein the message comprises an instant message, a chat message, a text message, or an e-mail message.

10. The computer-implemented method of claim 1, wherein the computing device comprises a mobile device.

11. A system comprising:
    at least one hardware processor; and
    a non-transitory machine-readable medium embodying a set of instructions that, when executed by the at least one hardware processor, cause the at least one processor to perform operations, the operations comprising:
        receiving a request to transmit a message from a computing device of a user via a network to a recipient, the request comprising content of the message;
        detecting an issue with the request using at least one classifier to classify the request as having the issue, the detecting of the issue comprising accessing profile data of a profile of the recipient stored in a database of a social networking service, and the detecting of the issue is based on a determination that the message is inappropriate for the recipient based on a combination of the accessed profile data of the profile of the recipient and the content of the message, the profile data of the profile of the recipient on which the detecting of the issue is based comprising at least one of a company to which the recipient belongs, a department within the company to which the recipient belongs, educational background information of the recipient, and a work industry of the recipient;
        generating an alert based on the detecting of the issue; and prior to transmitting the message to a destination associated with the recipient via the network, causing the generated alert to be displayed on the computing device of the user, the alert indicating the issue with the message.

12. The system of claim 11, wherein the detecting of the issue comprises accessing profile data of a profile of the user stored in the database of the social networking service, and the detecting of the issue is based on a combination of the accessed profile data of the profile of the recipient and the accessed profile data of the profile of the user.

13. The system of claim 11, wherein the content of the message comprises at least one of text in a body field of the message and a file that is attached to the message.

14. The system of claim 11, wherein the generated alert comprises:
a prompting of the user to respond to the displayed alert with feedback corresponding to the detected issue; and
at least one user interface element configured to enable the user to submit feedback corresponding to the detected issue in response to the displayed alert.

15. The system of claim 14, wherein the operations further comprise:
determining that the user has not submitted feedback corresponding to the detected issue within a predetermined time period; and
discarding the message without transmitting the message to the destination of the recipient based on the determining that the user has not submitted feedback corresponding to the detected issue within the predetermined time period.

16. The system of claim 14, wherein the operations further comprise:
receiving feedback submitted by the user via the at least one user interface element in response to the displayed alert, the feedback comprising a confirmation that the message is to be transmitted to the recipient; and
based on the feedback, using the request as training data in performing a machine learning process to train the at least one classifier.

17. The system of claim 11, wherein the computing device comprises a mobile device.

18. A non-transitory machine-readable medium embodying a set of instructions that, when executed by at least one hardware processor, cause the processor to perform operations, the operations comprising:
receiving a request to transmit a message from a computing device of a user via a network to a recipient, the request comprising content of the message;
detecting an issue with the request using at least one classifier to classify the request as having the issue, the detecting of the issue comprising accessing profile data of a profile of the recipient stored in a database of a social networking service, and the detecting of the issue is based on a determination that the message is inappropriate for the recipient based on a combination of the accessed profile data of the profile of the recipient and the content of the message, the profile data of the profile of the recipient on which the detecting of the issue is based comprising at least one of a company to which the recipient belongs, a department within the company to which the recipient belongs, educational background information of the recipient, and a work industry of the recipient;
generating an alert based on the detecting of the issue; and
prior to transmitting the message to a destination associated with the recipient via the network, causing the generated alert to be displayed on the computing device of the user, the alert indicating the issue with the message.

* * * * *